United States Patent [19]
Thompson

[11] Patent Number: 5,260,702
[45] Date of Patent: Nov. 9, 1993

[54] AIRCRAFT INFORMATION SYSTEM
[76] Inventor: Keith P. Thompson, 4584 E. Brookhaven Dr., Atlanta, Ga. 30319
[21] Appl. No.: 717,996
[22] Filed: Jun. 20, 1991

Related U.S. Application Data
[63] Continuation-in-part of Ser. No. 457,886, Dec. 27, 1989, abandoned.

[51] Int. Cl.⁵ ............................................. G08B 23/00
[52] U.S. Cl. .................................. 340/970; 244/180; 340/963; 364/428
[58] Field of Search ............... 340/963, 970, 971, 977; 244/180, 183, 186, 187, 191, 192, 193; 364/428, 430, 433; 73/178 T, 179

[56] References Cited

U.S. PATENT DOCUMENTS

| | | | |
|---|---|---|---|
| 3,626,163 | 12/1971 | Dommasch | 244/180 |
| 3,715,718 | 2/1973 | Astengo . | |
| 3,789,661 | 2/1974 | Melsheimer | 73/179 |
| 3,946,358 | 3/1976 | Bateman . | |
| 3,947,808 | 3/1976 | Bateman . | |
| 3,958,219 | 5/1976 | Bateman et al. . | |
| 4,060,793 | 11/1977 | Bateman . | |
| 4,250,746 | 2/1981 | Vassie et al. | 73/178 T |
| 4,293,840 | 10/1981 | Hadari | 340/970 |
| 4,302,827 | 11/1981 | Rosenblum | 367/116 |
| 4,355,294 | 10/1982 | Ben-David et al. | 340/970 |
| 4,551,723 | 11/1985 | Paterson | 340/963 |
| 4,695,013 | 9/1987 | Trampnau | 244/17.13 |
| 4,750,127 | 6/1988 | Leslie et al. | 73/178 T |
| 5,020,747 | 6/1991 | Orgun et al. | 364/428 |

*Primary Examiner*—Brent Swarthout
*Attorney, Agent, or Firm*—Hopkins & Thomas

[57] ABSTRACT

An aircraft landing information system is disclosed which provides to the aircraft pilot information regarding the actual and preferred sink rate of the aircraft, the distance between the landing gear wheels and the runway, and deviation of the actual sink rate from the preferred sink rate. An altitude determining sensor is provided on the aircraft and the information transmitted therefrom is fed into a microprocessor or like system which then presents the relevant data to the pilot in an audio and/or visual format to allow the pilot to touch down at the preferred sink rate.

20 Claims, 3 Drawing Sheets

AIRCRAFT INFORMATION SYSTEM

This application is a continuation-in-part of U.S. application Ser. No. 457,886, Filed Dec. 27, 1989, now abandoned.

BACKGROUND OF THE INVENTION

The invention relates to the field of aircraft systems that provide information to the pilot concerning aircraft descent rates.

Numerous prior art systems describe methods and devices to warn pilots of an excessive aircraft sink rate condition. Such systems, including those described in U.S. Pat. Nos. 3,715,718; 3,946,358; 3,947,808; 3,958,219; 4,060,793; and 4,551,723, provide a sink rate warning when the sink rate for a given aircraft altitude exceeds a predetermined threshold value. These systems have been generally designed for fixed wing aircraft. Similarly, U.S. Pat. Nos. 4,293,840 and 4,695,013 describe systems that warn of excessive descent rates particularly useful for helicopters.

U.S. Pat. No. 4,302,827 discloses a method of measuring the height of the aircraft above ground and relaying the height information to the pilot by auditory means such that he could be aware that the aircraft was at the best height above ground to flare the aircraft landing.

Although most of these prior art systems provide useful information by alerting the pilot to potentially dangerous excessive sink rate conditions or increasing the pilot's altitude awareness, none of these systems assist the pilot during the final phase of the landing approach (the landing flare) in landing the aircraft at a predetermined desired sink rate.

Under normal landing conditions, most pilots prefer to have their aircraft touch down at a low sink rate of 0-1 ft. per second. Under other conditions, such as a short runway, or conditions that effectively shorten the runway braking distance such as ice, snow, rain or gusty cross winds, the pilot may elect to touch down at a higher sink rate, perhaps 1—3 ft. per second. Touching down at a higher sink rate allows the wheels to more firmly contact the runway pavement, facilitates more effective braking, earlier deployment of spoilers and thrust reversers, and more positive directional control of the aircraft on the runway. Currently, pilots estimate the aircraft sink rate based on visual cues from the landing environment and adjust the sink rate by control inputs to the elevator, usually by means of fore and aft pressure on the control wheel.

On a precision instrument approach, an aircraft arrives 0.5 miles from the runway threshold at an altitude of approximately 200 ft. above ground level. The pilot relies on cockpit instrumentation to arrive at this position under instrument meteorological conditions, and utilizes a combination of external visual cues and cockpit instrumentation during a visual approach. Most precision approaches utilize a 3 glide slope. Therefore, the vertical sink of the aircraft on the glide slope can be determined by the following relationship:

Sink rate* = ground speed* × sin 3°

*Sink rate and ground speed in feet per second.

For an aircraft with an approach speed of 130 knots, the sink rate is 11.4 ft./sec.

On a standard glide slope, the aircraft crosses the end of the runway (runway threshold) at a height of approximately 50 feet. The distance between the landing gear of the aircraft and the runway is referred to hereafter as the runway altitude.

Regardless of the type of approach, the last portion of the landing (50 ft. runway altitude to touch down) generally referred to as the landing flare, is usually performed by the pilot solely with reference on his visual perception. During the flare, the pilot reduces the sink rate of the aircraft to touch down at the desired sink rate.

The pilot relies on his depth perception, visual cues from the landing environment, and previous landing experiences to sense the altitude of the aircraft's wheels above the runway and the sink rate of the aircraft as it nears touch down. The pilot reduces the sink rate of the aircraft to the desired value as the wheels near the runway. If the pilot desires the smoothest landing possible, he will attempt to reduce the sink rate of the aircraft to a very low value (1 ft. per second or less) before the wheels contact the runway. If the pilot desires a firmer touch down, he will arrest the sink rate less, perhaps to value of 2-3 feet per second.

The pilot's eye level at touch down in transport category aircraft is greater than 15 feet above the runway and the aircraft is traveling at a horizontal speed in excess of 100 knots (150 FPS). At this distance and speed, the pilot's ability to consistently judge the exact height of the aircraft's wheels above the runway and the sink rate of the aircraft is limited. This inability to judge relatively small heights (several feet) and small changes in sink rate during touch down are the primary factors leading to aircraft touch downs at undesirable sink rates. This is more likely to occur when a pilot is landing at an unfamiliar airport, at night, or on a sloping runway, since these situations all reduce the familiar visual cues the pilot relies upon to adjust the aircraft's sink rate during touch down. Most touch downs with undesirable sink rates are by no means unsafe or dangerous. However, undesirably firm landings accelerate the wear of landing gear and airframe components and increase aircraft passenger anxiety. Occasionally, hard landings cause structural damage to the airplane. Landings which occur at less than the desired sink rate on a short or slippery runway may prolong the aircraft landing distance and increase the chance of an overrun. Therefore, there is need for a system which will assist the pilot to more accurately adjust the sink rate of the aircraft so he may touch down at the desired sink rate.

SUMMARY OF THE INVENTION

An object of the present invention is to provide a preferred sink rate vs. runway altitude relationship (sink rate function) which, if flown by the pilot, will provide a high probability of achieving the desired sink rate of the aircraft at the moment of touch down.

Another object of the present invention is to provide a system that provides the pilot with information comparing the actual sink rate of the aircraft to a preferred sink rate necessary to achieve touch down at a preselected sink rate.

A further object of the present invention is to provide means which convey deviation of the actual vs. preferred sink rate function to the pilot in an auditory modulated format.

A further object of the present invention is to provide means which convey deviation of the actual vs. preferred sink rate function to the pilot in a visually modulated format.

Another object of the present invention is to produce a system for landing assistance which displays to the pilot the sink rate of the aircraft during the landing flare so he may evaluate and improve his landing performance.

A still further object of the present invention is to provide a system for landing assistance which is easily utilized by aircraft pilots during the final portion of the landing approach and which contributes to the safety and convenience of air travel.

These and other objects are obtained by the present invention which describes a landing assistance system for providing a preferred sink rate vs. runway altitude relationship termed preferred sink rate function based on the pilot's pre-selected target sink rate for touch down. The invention also discloses a method to compare this relationship to the actual sink rate vs. runway altitude relationship, termed actual sink rate function of the aircraft during the landing flare, and which provides information to the pilot concerning deviation of the actual sink rate function from the preferred sink rate function in an auditory or visual format or both. The system continuously measures the distance between the landing gear and the runway during a landing approach and computes both the height above runway, and the instantaneous sink rate at that altitude. Deviation of the actual sink rate function from the preferred sink rate function is converted into an auditory and/or visual signal that is relayed to the pilot. Based on this information, the pilot can adjust his sink rate during the landing flare to touch down at the desired sink rate.

The system, in general, includes a sensitive height determining means such as a radar altimeter or the like to determine the distance between the landing gear and the runway, this distance termed the runway altitude. This information is conveyed to a high speed microprocessor which computes both the height above runway and the instantaneous sink rate at that runway altitude. The microprocessor also has stored a preferred sink rate vs. altitude relationship termed preferred sink rate function which the pilot can pre-select prior to the landing approach. The deviation between the actual and preferred sink rate functions is then converted by the microprocessor by means of a signal generator into a auditory or visual signal, or both, and conveyed either to the pilot or to an auto-landing computer system. The present system is configured to suit the particular aircraft type in which it is installed, and since the system is self-contained within the aircraft, no airport installation is required, and the system will perform its function at any landing site.

DETAILED DESCRIPTION OF THE PREFERRED EMBODIMENT

Figure 1:
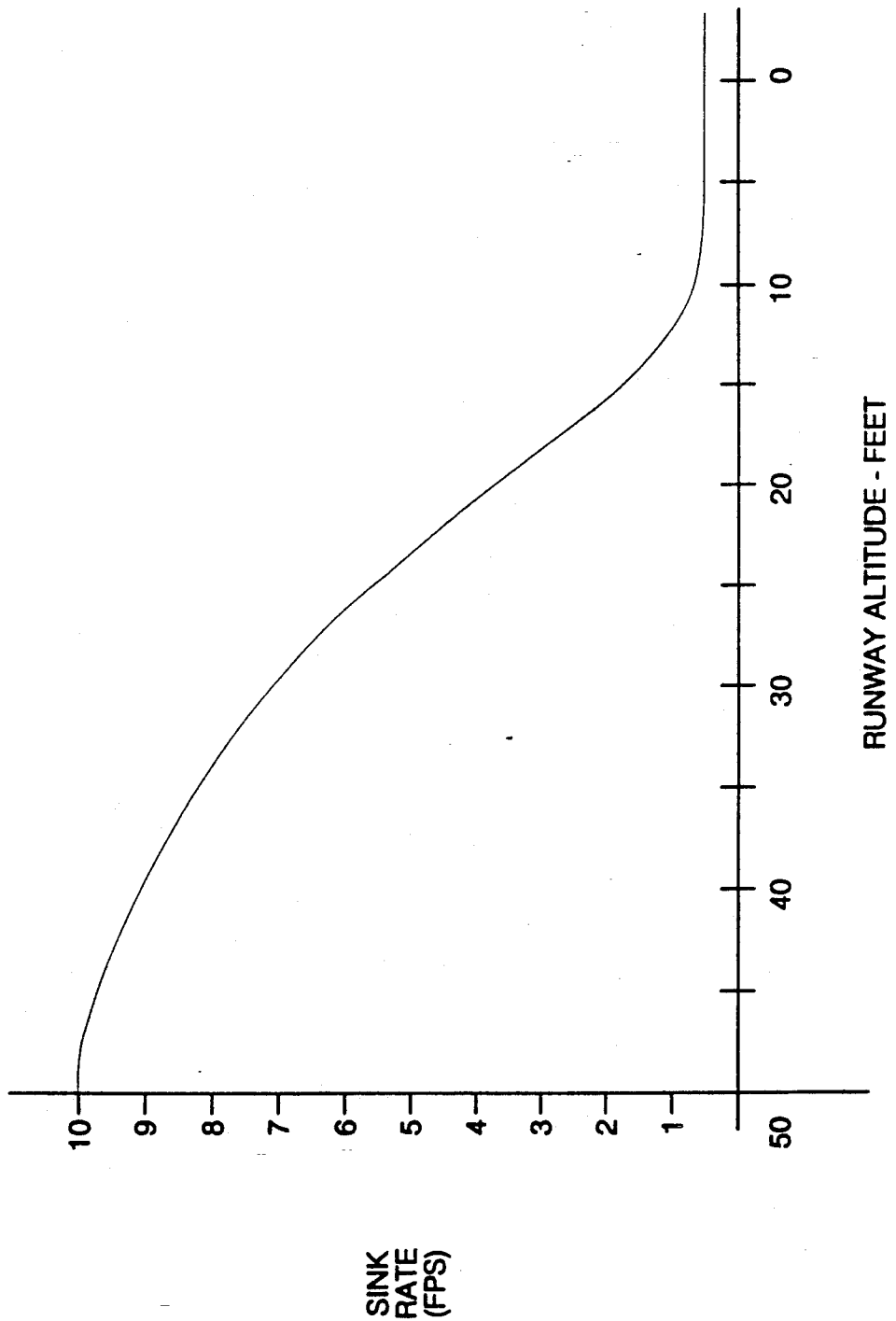
FIG. 1 is a graph illustrating sink rate as a function of runway altitude in accordance with the present invention.

FIG. 1 shows an example of the sink rate of a hypothetical aircraft (feet per second) as a function of the runway altitude (feet) during the landing flare, and is referred to herein as the sink rate function.

The sink rate at altitude 0 in this example (touch down) is 1 foot per second, which results in a smooth touch down. There are, of course, an infinite number of curves which could be drawn to intersect the ordinate at 1 foot per second, but certain factors can be used to define an aircraft sink rate function that produces the maximum probability of touching down at the target sink rate of 1 foot per second. These factors include pilot performance and reaction time, aircraft performance parameters such as air speed, angle of attack, engine thrust, ground effect, and aerodynamic configuration. A further parameter used to design a preferred sink rate function is the desired presence or absence of acceleration (acting in the vertical direction) at the moment of touch down. Note that for the general sink rate function $$F(X) = K(Y)$$

(where $X$ = the runway altitude, $Y$ = the sink rate, and $F$ and $K$ are constants), that $F'(X)$, (the first derivative) or the instantaneous slope of the sink rate function curve, defines the sink rate acceleration (or deceleration). It may be desirable not only to land at a preferred sink rate of say 1 foot per second, but also to touch down at 1 foot per second with near zero vertical acceleration.

Thus, a preferred sink rate function, $F(X)$, may be defined that takes into consideration a variety of factors necessary to achieve the maximum probability of touch down at the desired sink rate and acceleration.

Figure 2:
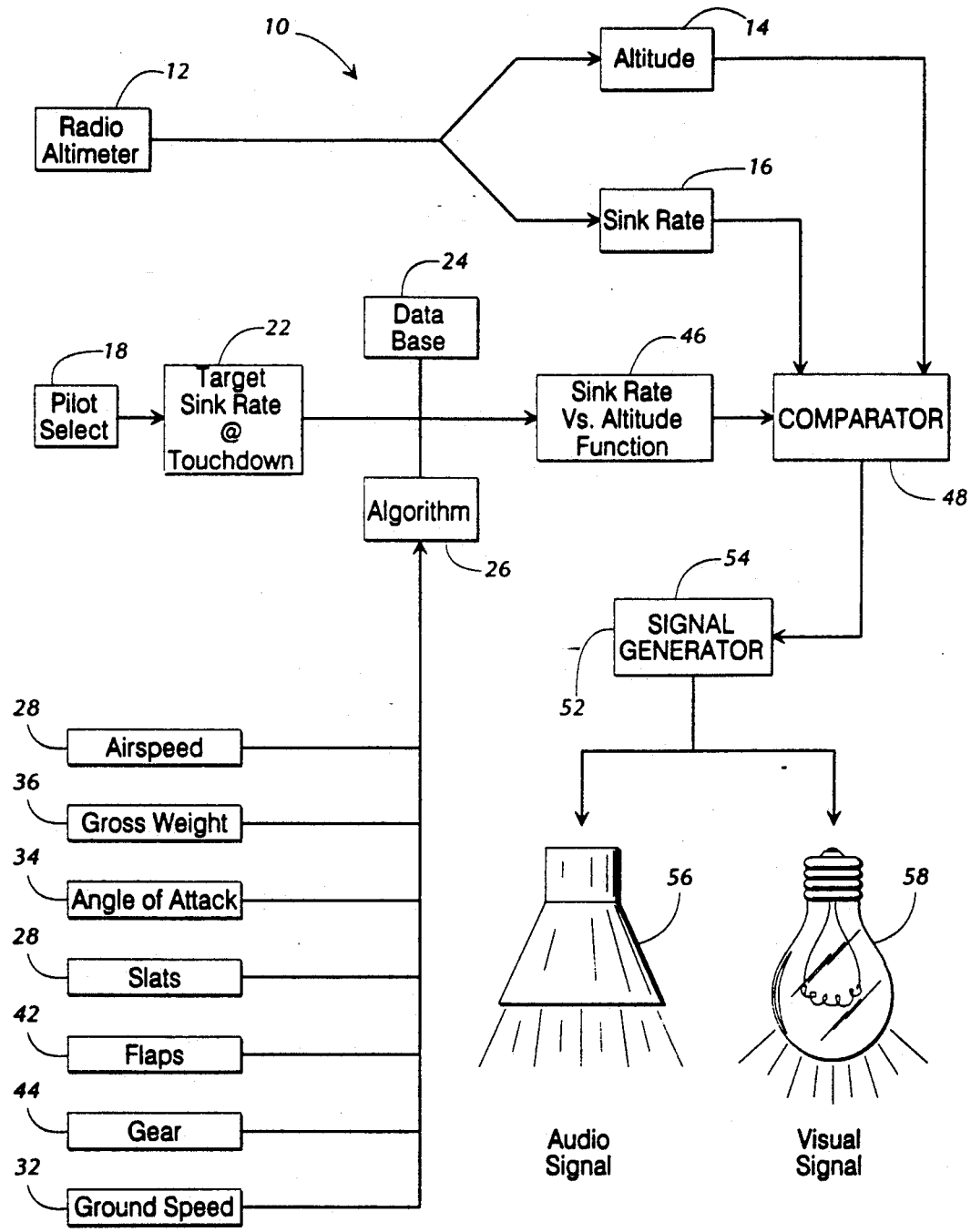
FIG. 2 is a block diagram of the present invention.

FIG. 2 shows by way of a logical block diagram the landing assistance system 10. A radio altimeter 12, barometric altimeter, or like means is used to measure height of the aircraft above the runway (runway altitude, as indicated by block 14). A differentiated signal from this instrument (measuring the change in height over time) determines the instantaneous sink rate, as indicated by block 16. Such an altitude measuring device is preferably mounted adjacent or on the landing gear of the aircraft, so as to "see" both the wheels and the runway. This also serves to minimize or eliminate clutter in the system such as that which might be obtained due to interference from engines, propellors, etc. As indicated by blocks 18, 22, the system has provisions for the pilot to select his target sink rate and sink rate acceleration (not shown) at touch down. From this information, the system either selects the preferred sink rate function from a database 24, calculates a preferred sink rate function from an algorithm 26, or uses a combination of a preselected sink rate function which is then modified by an algorithm 26 that receives input from certain aircraft performance parameters such as air speed 28, ground speed 32, angle of attack 34, gross weight 36, and configuration of slats 38, flaps 42, and landing gear 44. Another input possibility includes the use of a vertical speed indicator as a sink rate measuring means.

The system thus produces a preferred sink rate function 46 which is flown by the pilot, maximizes the probability of touching down at his preselected sink rate and acceleration, and is appropriate for the type of aircraft as well as the flight characteristics of the aircraft. As indicated by block 48 the actual sink rate function of the aircraft is computed by combining the runway altitude 16 and sink rate 16 at that altitude 14 as measured by the radio altimeter 12 or the like, which is then compared to the optimized sink rate function 46 by the system's microprocessor. Deviations of the actual sink rate function from the optimized sink rate function produce an output signal 22 by means of a signal generator 54, which is relayed to the pilot via audio and/or visual means 56,58.

Alternatively, means may be provided for determining a desired aircraft vertical kinetic energy at touch down, according to the relationship:

$$Vke = K(\tfrac{1}{2}V^2 + A)$$

where Vke equals Vertical kinetic energy, K is a constant proportional to the mass of the aircraft, V equals vertical sink rate and A equals sink rate acceleration. The vertical kinetic energy may also be determined by $Vke = \tfrac{1}{2}MV^2 + MA$ where M = the mass of the aircraft and all other variables are as defined above.

Figure 3:
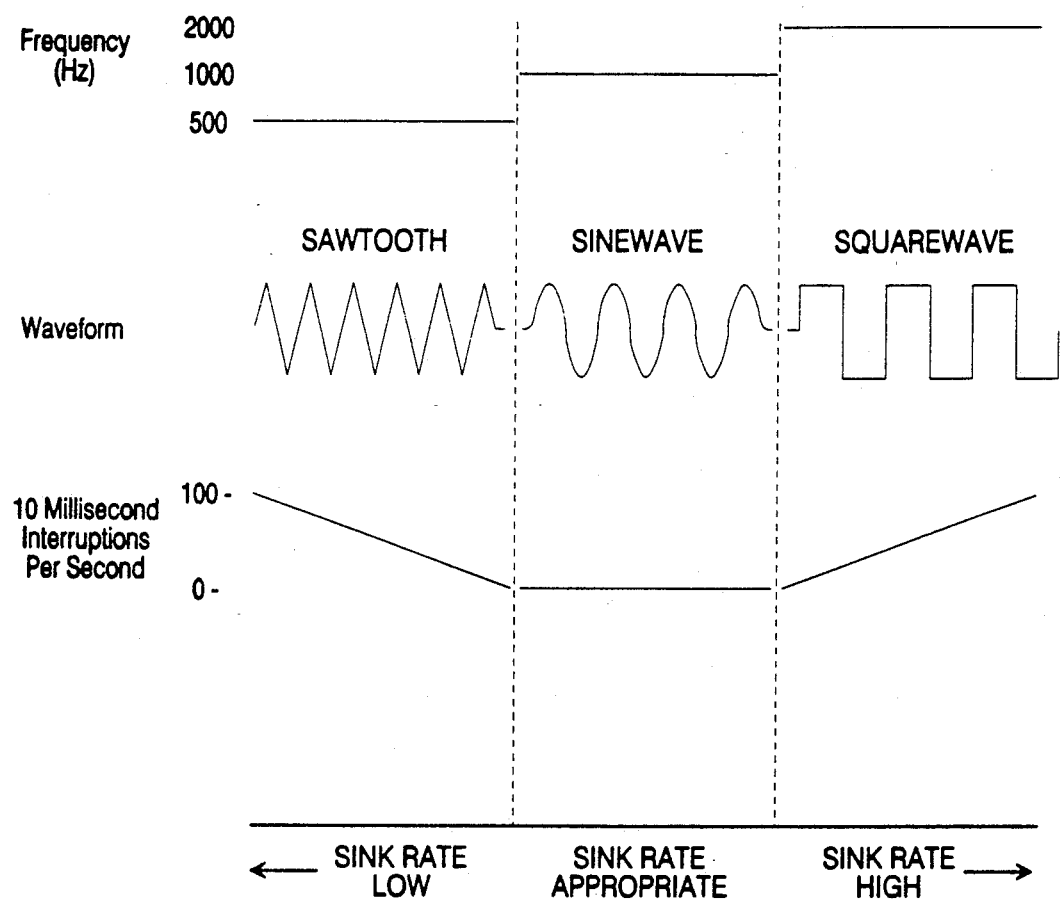
FIG. 3 is a graph showing a plurality of output signals corresponding with particular deviations of the actual sink rate from the preferred sink rate.

In a preferred embodiment of the invention, an auditory signal is used to signal the pilot of a deviation from the preferred sink rate function. As a nonlimiting example, FIG. 3 defines the auditory output of the signal generator for deviations of the actual from the preferred sink rate function. If the pilot maintains the sink rate of the aircraft appropriate for runway altitude as defined by the preferred sink rate function, the auditory output will consist of a 1000 Hz sine wave tone with no interruptions. If, during the landing flare, the aircraft's sink rate becomes higher than that defined by the preferred sink rate function, a 2000 Hz square wave tone will be generated that has 10 msec interruptions which occur at a rate proportional to the magnitude of deviation of the actual from the preferred sink rate. Similarly, if the sink rate becomes too low, a 500 Hz saw tooth tone is produced with 10 msec interruptions that occur at a rate proportional to the magnitude of deviation.

Since the pilot is given immediate warning that the aircraft sink rate function is deviating from the preferred sink rate function during the landing flare, he may quickly initiate corrective action through inputs to the aircraft control system to return to the appropriate sink rate and touch down at the desired rate of descent.

While an embodiment of an aircraft landing information system and modifications thereof have been shown and described in detail herein, various additional changes and modifications may be made without departing from the scope of the present invention.

I claim

1. An aircraft landing information system to assist an aircraft pilot in achieving a desired sink rate at touch down, comprising:
   a) means for measuring the height of the aircraft above the runway;
   b) means for measuring the aircraft's instantaneous sink rate;
   c) means for determining a desired aircraft vertical kinetic energy at the touch down, said vertical kinetic energy proportional to $$Vke = K(\tfrac{1}{2}V^2 + A)$$

where Vke = vertical kinetic energy, K is a constant proportional to the mass of the aircraft, V = vertical sink rate, A = sink rate acceleration;
   d) means for determining an optimal sink rate, said optimal sink rate being a preferred relationship between aircraft sink rate and aircraft altitude above runway to achieve the desired aircraft vertical kinetic energy at the touch down;
   e) means for computing a deviation of the aircraft's instantaneous sink rate from the optimal sink rate as a function of altitude above runway; and
   f) means for signaling said deviation to the pilot.

2. An aircraft landing information system for an aircraft to assist an aircraft pilot in achieving a desired sink rate at touch down on a runway, consisting of:
   a) means for measuring an altitude of the aircraft above the runway;
   b) means for measuring an instantaneous sink rate acceleration of the aircraft;
   c) means for determining a preferred sink rate at said touch down;
   d) means for determining a preferred sink rate acceleration as a function of said altitude to achieve the preferred sink rate at said touch down;
   e) means for computing a deviation of the instantaneous sink rate acceleration from said preferred sink rate acceleration; and
   f) means for signaling said deviation to the pilot.

3. An aircraft landing information system for an aircraft to assist an aircraft pilot in achieving a desired sink rate at touch down on a runway, comprising:
   a) means for measuring an altitude of the aircraft above the runway;
   b) means for measuring an instantaneous sink rate acceleration of the aircraft;
   c) means for determining a preferred desired sink rate acceleration at the touch down;
   d) means for determining the preferred sink rate acceleration as a function of said altitude to achieved the desired sink rate acceleration at said touch down;
   e) means for computing a deviation of the instantaneous sink rate acceleration from said preferred sink rate acceleration; and
   f) means to signal said deviation to the pilot.

4. An aircraft landing assistance system for an aircraft to assist an aircraft pilot in achieving a desired sink rate at touch down on a runway, comprising:
   a) means for measuring the height of the aircraft above the runway;
   b) means for measuring an instantaneous sink rate acceleration of the aircraft;
   c) means for determining both a preferred sink rate and a preferred instantaneous sink rate acceleration at said touch down;
   d) means for determining the preferred sink rate acceleration as a function of said height above the runway to achieve the preferred sink rate acceleration at said touch down;
   e) means for computing a deviation of the sink rate acceleration from said preferred sink rate acceleration; and
   f) means to signal said deviation to the pilot.

5. An aircraft landing information system for an aircraft to assist an aircraft pilot in achieving a desired sink rate at touch down on a runway, comprising:
   a) means for measuring an altitude of the aircraft above the runway;
   b) means for measuring an instantaneous sink rate of the aircraft and changes therein;
   c) means for determining a desired aircraft vertical kinetic energy at said touch down, said vertical kinetic energy proportional to $$Vke = \tfrac{1}{2}MV^2 + MA$$

where Vke = vertical kinetic energy, M = mass of the aircraft, V = vertical sink rate, A = sink rate acceleration;

d) means for determining a preferred change of said instantaneous sink rate as a function of said altitude to achieve the desired aircraft vertical kinetic energy at said touch down;

e) means for computing a deviation of an actual change in said instantaneous sink rate from the preferred change; and f) means for signaling said deviation to the pilot.

6. An aircraft landing information system for assisting a pilot of an aircraft in achieving a desired sink rate at touch down on a runway, comprising:

altitude measuring means for measuring an instantaneous altitude of said aircraft;

sink rate measuring means for measuring an instantaneous sink rate of said aircraft;

means for determining said desired sink rate at said touch down;

means for determining an optimal sink rate from an optimal sink rate function, said optimal sink rate function being a relationship between said instantaneous sink rate and said altitude to achieve said desired sink rate at said touch down;

means for computing a deviation of said instantaneous sink rate from said optimal sink rate, said deviation being a function of altitude change; and signaling means for generating one of a plurality of signals at an instant in time indicative of said deviation, said signals including a first signal indicating that said deviation is inappropriate and that said instantaneous sink rate is to be increased to achieve said desired sink rate, a second signal indicating that said deviation and said instantaneous sink rate are appropriate to achieve said desired sink rate, and a third signal indicating that said deviation is inappropriate and that said instantaneous sink rate is to be decreased to achieve said desired sink rate.

7. The system of claim 6, wherein said altitude measuring means is a radio altimeter.

8. The system of claim 6, wherein said altitude measuring means is a barometric altimeter.

9. The system of claim 6, wherein said sink rate measuring means is a differentiated radio altimeter signal.

10. The system of claim 6, wherein said sink rate measuring means utilizes a differentiated signal from a barometric altimeter.

11. The system of claim 6, wherein said means for signalling is an auditory indicator.

12. The system of claim 6, wherein said means for signaling is a visual indicator.

13. The system of claim 6, wherein said means for determining an optimal sink rate uses an aircraft performance parameter and a status parameter in determining said optimal sink rate function.

14. The system of claim 6, wherein said altitude measuring means is located adjacent to landing gear of said aircraft.

15. The system of claim 6, wherein said sink rate measuring means is a vertical speed indicator.

16. An aircraft landing information system to assist a pilot of an aircraft in achieving a desired sink rate at touch down on a runway, comprising:

altitude measuring means for measuring an instantaneous altitude of said aircraft;

sink rate measuring means for measuring an instantaneous sink rate of said aircraft;

means for determining a desired sink rate acceleration at said touch down;

means for determining an optimal sink rate from an optimal sink rate function, said optimal sink rate function being a relationship between said instantaneous sink rate and said altitude to achieve said desired sink rate acceleration;

means for computing a deviation of said instantaneous sink rate from said optimal sink rate, said deviation being a function of altitude change; and signaling means for generating one of a plurality of signals at an instant in time indicative of said deviation, said signals including a first signal indicating that said deviation is inappropriate and that said instantaneous sink rate is to be increased to achieve said desired sink rate acceleration, a second signal indicating that said deviation and said instantaneous sink rate are appropriate to achieve said desired sink rate acceleration, and a third signal indicating that said deviation is inappropriate and that said instantaneous sink rate is to be decreased to achieve said desired sink rate acceleration.

17. The system of claim 16, wherein said sink rate measuring means is a vertical speed indicator.

18. The system of claim 16, wherein said altitude measuring means is a radio altimeter.

19. The system of claim 16, wherein said altitude measuring means is a barometric altimeter.

20. An aircraft landing information system for assisting a pilot of an aircraft in achieving a desired sink rate at touch down on a runway, comprising:

altitude measuring means for measuring an instantaneous altitude of said aircraft;

sink rate measuring means for measuring an instantaneous sink rate of said aircraft;

means for determining a desired sink rate at said touch down and a desired sink rate acceleration at said touch down;

means for computing an optimal sink rate from an optimal sink rate function, said optimal sink rate function being a relationship between said instantaneous sink rate and said altitude to achieve said desired sink rate acceleration at said touch down;

means for computing a deviation of said instantaneous sink rate from said optimal sink rate, said deviation being a function of altitude change; and signaling means for generating one of a plurality of signals at an instant in time indicative of said deviation, said signals including a first signal indicating that said deviation is inappropriate and that said instantaneous sink rate is to be increased to achieve said desired sink rate acceleration, a second signal indicating that said deviation and said instantaneous sink rate are appropriate to achieve said desired sink rate, and a third signal indicating that said deviation is inappropriate and that said instantaneous sink rate is to be decreased to achieve said desired sink rate.

* * * * *